United States Patent [19]

Liaw et al.

[11] Patent Number: 5,712,788
[45] Date of Patent: Jan. 27, 1998

[54] INCREMENTAL ROUTE CALCULATION

[75] Inventors: Jeff Jyh-Min Liaw, San Jose; Simon Peter Desai; Haruhisa Tamai, both of Sunnyvale, all of Calif.

[73] Assignee: Zexel Corporation, Tokyo, Japan

[21] Appl. No.: 385,611

[22] Filed: Feb. 9, 1995

[51] Int. Cl.⁶ .................................................. G06F 165/00
[52] U.S. Cl. .......................... 364/449.3; 364/444.2; 364/449.5; 340/990; 340/995
[58] Field of Search ................................. 364/443, 444.2, 364/449.3, 449.5; 73/178 R; 340/988, 990, 995

[56] References Cited

U.S. PATENT DOCUMENTS

| | | | |
|---|---|---|---|
| 3,845,289 | 10/1974 | French | 364/424.02 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/559 |
| 4,672,565 | 6/1987 | Kuno et al. | 364/457 |
| 4,673,878 | 6/1987 | Tsushima et al. | 364/449 |
| 4,723,218 | 2/1988 | Hasebe et al. | 364/449 |
| 4,734,863 | 3/1988 | Honey et al. | 364/449 |
| 4,751,512 | 6/1988 | Longaker | 342/357 |
| 4,782,447 | 11/1988 | Ueno et al. | 364/449 |
| 4,796,191 | 1/1989 | Honey et al. | 364/449 |
| 4,797,841 | 1/1989 | Hatch | 364/559 |
| 4,831,563 | 5/1989 | Ando et al. | 364/457 |
| 4,862,398 | 8/1989 | Shimizu et al. | 364/449 |
| 4,914,605 | 4/1990 | Loughmiller, Jr. et al. | 364/443 |
| 4,918,609 | 4/1990 | Yamawaki | 364/449 |
| 4,926,336 | 5/1990 | Yamada | 364/449 |
| 4,937,753 | 6/1990 | Yamada | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukirchner et al. | 364/442 |
| 4,989,151 | 1/1991 | Nuimura | 364/449 |
| 4,992,947 | 2/1991 | Nuimura et al. | 364/449 |
| 4,996,645 | 2/1991 | Schneyderberg Van der Zon | 364/449 |
| 4,999,783 | 3/1991 | Tenmoku et al. | 364/449 |
| 5,040,122 | 8/1991 | Neukirchner et al. | 364/449 |
| 5,046,011 | 9/1991 | Kakihara et al. | 364/449 |
| 5,060,162 | 10/1991 | Ueyama et al. | 364/449 |
| 5,177,685 | 1/1993 | Davis et al. | 364/449 |
| 5,272,638 | 12/1993 | Martin et al. | 364/449 |
| 5,283,743 | 2/1994 | Odagawa | 364/449 |
| 5,287,297 | 2/1994 | Ihara et al. | 364/449 |
| 5,297,050 | 3/1994 | Ichimura et al. | 364/449 |
| 5,369,588 | 11/1994 | Hayami et al. | 364/444 |

(List continued on next page.)

FOREIGN PATENT DOCUMENTS

| | | |
|---|---|---|
| 0 485 120 A2 | 5/1992 | European Pat. Off. |
| 0 575 943 A1 | 12/1993 | European Pat. Off. |
| 2 271 423 | 4/1994 | United Kingdom |

OTHER PUBLICATIONS

R.L. French, "Map Matching Origins Approaches and Applications," Rober L. French & Associates, 3815 Lisbon St., Suite 201, Fort Worth, Texas 76107, USA, pp. 91–116.

*Primary Examiner*—Gary Chin
*Attorney, Agent, or Firm*—Joseph M. Villeneuve; Hickman, Beyer & Weaver

[57] ABSTRACT

Method and apparatus for determining a route from a source location to a final destination using a vehicle navigation system having a map database. At least one intermediate destination is determined from the map database, each intermediate destination being at the other end of an intermediate route from the source location. A cost value is calculated for each intermediate destination. A best intermediate destination is selected from the at least one intermediate destination, the cost value corresponding to the best intermediate destination being lower than the cost values corresponding to any other intermediate destinations. The intermediate route corresponding to the best intermediate destination is then communicated to the user of the vehicle navigation system while a remainder route to the final destination is determined.

14 Claims, 5 Drawing Sheets

U.S. PATENT DOCUMENTS

| | | | |
|---|---|---|---|
| 5,410,485 | 4/1995 | Khikawa | 364/449 |
| 5,412,573 | 5/1995 | Barnea et al. | 364/449 |
| 5,463,554 | 10/1995 | Araki et al. | 364/449 |
| 5,486,822 | 1/1996 | Tenmoku et al. | 364/449 |
| 5,506,774 | 4/1996 | Nobe et al. | 364/449 |
| 5,513,110 | 4/1996 | Fujita et al. | 364/444 |
| 5,519,619 | 5/1996 | Seda | 364/444 |
| 5,521,826 | 5/1996 | Matsumoto | 364/449 |

# INCREMENTAL ROUTE CALCULATION

BACKGROUND OF THE INVENTION

The present invention relates to the determination of routes by a vehicle navigation system. More specifically, the invention provides a method and apparatus for determining an intermediate route to a user's final destination where the determination of the entire route takes longer than a given interval of time. In this way, the user may begin driving before the entire route to the final destination has been determined.

As the coverage and feature density of available map databases increase, the time required for the calculation of long distance routes has correlatively increased. For particularly long or complex routes, undesirable delays may be experienced before the user may leave her initial location. If the user decides to leave before the route has been calculated, she will be operating without instructions from the navigation system and will likely depart from the eventually calculated route, thereby rendering the calculation useless. The above-described effects of long route calculation time could be mitigated if there were a way in which the first few instructions or maneuvers could be determined and communicated to the user before the entire route calculation is complete.

SUMMARY OF THE INVENTION

The present invention provides a way in which an intermediate route may be determined to a location between the initial starting or source location and the final destination. The user of a vehicle navigation system generally requires only enough information to get to a nearby highway in order to begin driving. To this end, the present invention selects an intermediate destination, such as a freeway entrance ramp, and communicates the maneuvers necessary to reach the intermediate destination to the user, while simultaneously calculating the remainder of the route to the final destination. The determination of the route to the intermediate location, being much less computationally intense than the calculation of the entire route, requires only a few seconds, thereby allowing the user to begin driving before the entire route is known.

According to the invention, a method and apparatus for determining a route from a source location to a final destination using a vehicle navigation system is disclosed. In a specific embodiment, at least one intermediate destination is determined from the system's map database, each being at one end of a corresponding intermediate route from the source location. When more than one intermediate destination is found, a cost value is then calculated for each, on the basis of which, the best intermediate destination, i.e., the intermediate destination having the lowest cost value, is selected from among the possible intermediate destinations. The intermediate route corresponding to the best intermediate destination is then communicated to the user of the vehicle navigation system while the remaining route to the final destination is determined.

In a specific embodiment of the invention, the roads in the map database are organized hierarchically, each road having a hierarchy level associated therewith. The source location corresponds to a source road of a first hierarchy level. In this embodiment, the intermediate destinations are determined in the following manner. Possible routes from a first road segment connected to the source location are explored until a connecting road is encountered having a second hierarchy level higher than the first. The access point to the connecting road is then designated as an intermediate destination. This is repeated for each of the road segments extending from the source location.

In another specific embodiment, each intermediate route includes at least one node and at least one road segment which are stored in the map database, and which connect the source location with the intermediate destination corresponding to that intermediate route. Each node in the map database has an associated node cost, and each road segment in the map database has an associated segment cost. In this embodiment, the cost value for an intermediate destination is calculated as follows. The segment and node costs for the road segments and nodes in the intermediate route are combined, thereby generating a route cost for the intermediate route. A heuristic cost for the intermediate destination associated with the intermediate route is then determined. The heuristic cost corresponds to the distance between the intermediate destination and the final destination. The route cost and the heuristic cost are then combined, thereby generating a cost value for the intermediate destination. This procedure is repeated for any remaining intermediate destinations. In various specific embodiments, a segment cost corresponds to an estimate of a time interval required for traversing a road segment, a node cost corresponds to an estimate of a time interval required for traversing a node, and a first distance corresponds to a substantially straight-line distance between a first intermediate destination and the final destination.

In still another specific embodiment, the present invention waits until the expiration of a timeout period before selecting a best intermediate destination. This is so that if the entire route to the final destination is determined before the end of the timeout period, and communication of an intermediate route therefore becomes unnecessary, the communication of the entire route may begin instead. In a more specific embodiment, if the entire route to the final destination is not complete before a given timeout interval, the system then determines another intermediate destination between the first intermediate destination and the final destination. Initially, at least one next intermediate destination is determined from the map database. As with the previously described embodiment, if more than one next intermediate destination is found, a cost value is calculated for each, the next intermediate destination with the lowest cost value being selected as the best next intermediate destination. The next intermediate route corresponding to the best next intermediate destination is then communicated to the user. This process may be repeated until the remainder of the entire route has been determined. In a specific embodiment, each intermediate route is fully determined and communicated to the user only when the determination of the remainder of the entire route requires more than a programmable timeout interval.

A further understanding of the nature and advantages of the present invention may be realized by reference to the remaining portions of the specification and the drawings.

DESCRIPTION OF THE PREFERRED EMBODIMENT

The present invention relates generally to commonly assigned U.S. Pat. No. 5,345,382 to Kao for CALIBRATION METHOD FOR A RELATIVE HEADING SENSOR, and U.S. Pat. No. 5,359,529 to Snider for ROUTE GUIDANCE ON/OFF-ROUTE STATE FILTER, and commonly assigned, copending United States patent applications for POSITION CORRECTION METHOD FOR VEHICLE NAVIGATION SYSTEM, Ser. No. 08/000,950 filed on Jan. 5, 1993, METHOD FOR SELECTING A DESTINATION IN A VEHICLE NAVIGATION SYSTEM, Ser. No. 08/099,207 filed on Jul. 29, 1993, METHOD FOR IDENTIFYING HIGHWAY ACCESS RAMPS FOR ROUTE CALCULATION IN A VEHICLE NAVIGATION SYSTEM, Ser. No. 08/263,604 filed on Jun. 20, 1994, and VEHICLE NAVIGATION SYSTEM WITH UPGRADEABLE NAVIGATION SOFTWARE AND A FLEXIBLE MEMORY CONFIGURATION, Ser. No. 08/293,856 filed on Aug. 19, 1994, the entire specifications of which are incorporated herein by reference.

Figure 1:
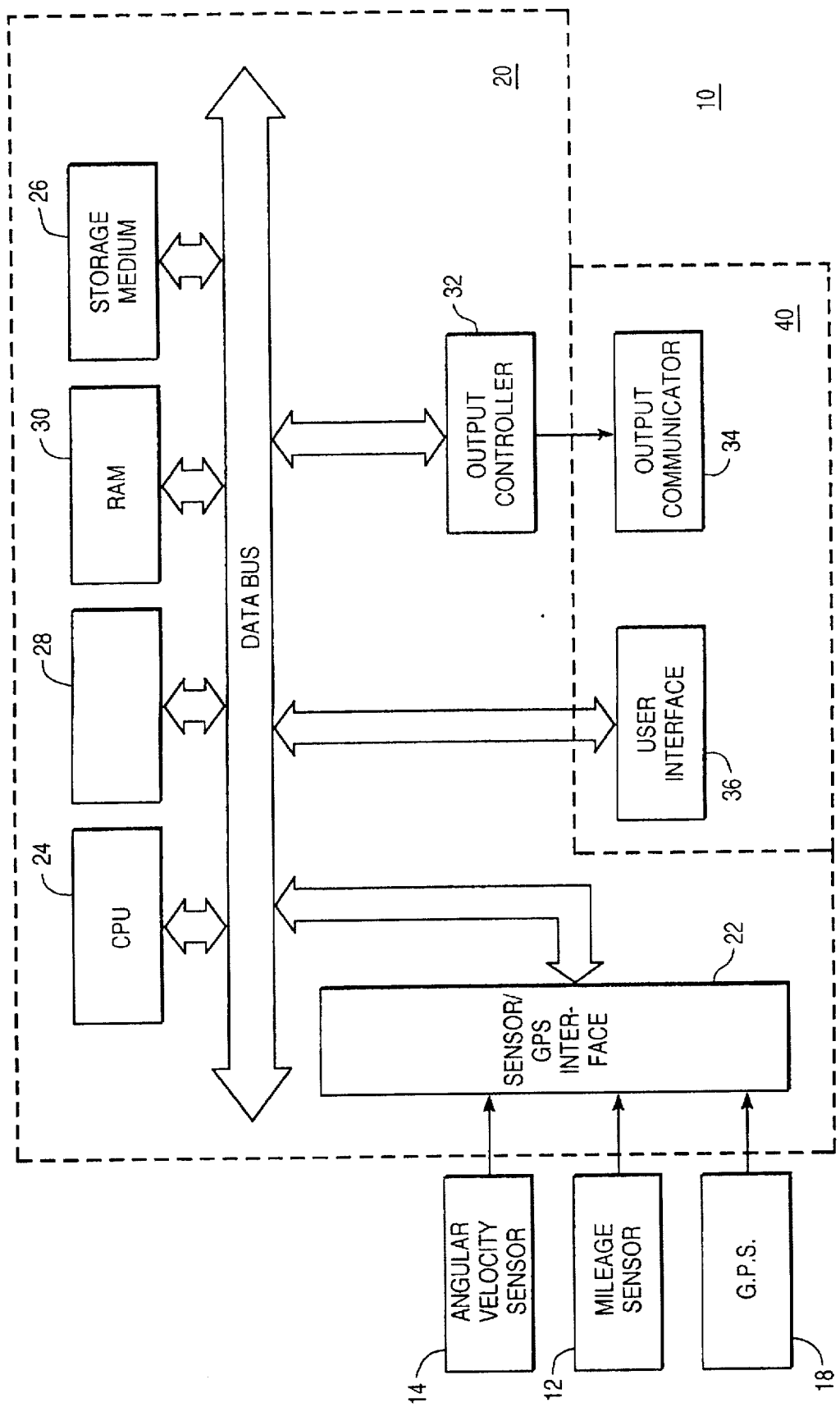
FIG. 1 is a block diagram of a vehicle navigation system for use with the present invention.

FIG. 1 is a block diagram of a specific embodiment of a vehicle navigation system 10 for use with the present invention. Sensors 12 and 14 and GPS receiver 18 are coupled to computing means 20 through sensor/GPS interface 22. In typical embodiments, mileage sensor 12 comprises an odometer, and angular velocity sensor 14 comprises a gyroscope, or a differential odometer coupled to the wheels of the vehicle. A global positioning system (GPS) data receiver 18 is provided for receiving signals from, for example, a satellite-based navigation system. Data from sensor/GPS interface 22 is transmitted to CPU 24, which performs calibration, signal processing, dead-reckoning, vehicle positioning, and route guidance functions. A database containing map information may be stored in database medium 26, with software directing the operation of computing means 20 stored in main memory 28 for execution by CPU 24. Memory 28 may comprise read-only memory (ROM), or reprogrammable non-volatile memory such as flash memory or SRAM. System RAM 30 permits reading and writing of the information necessary to execute such software programs. Database medium 26 may comprise non-volatile memory, a hard disk drive, CD-ROM, or an integrated circuit in which digitized map information has been stored. Output controller 32, which may comprise a graphics controller, receives data processed by CPU 24 and transmits the data to display console 40 which includes output communicator 34, usually comprising a display screen. The user may input data, such as a desired destination, through user interface 36, typically comprising a keyboard.

The map database stored in database medium 26 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value which relates to the category or type of the road. For example, the highest level category of the hierarchy includes freeways and expressways. The lowest level includes residential streets and/or alleys.

Figure 2:
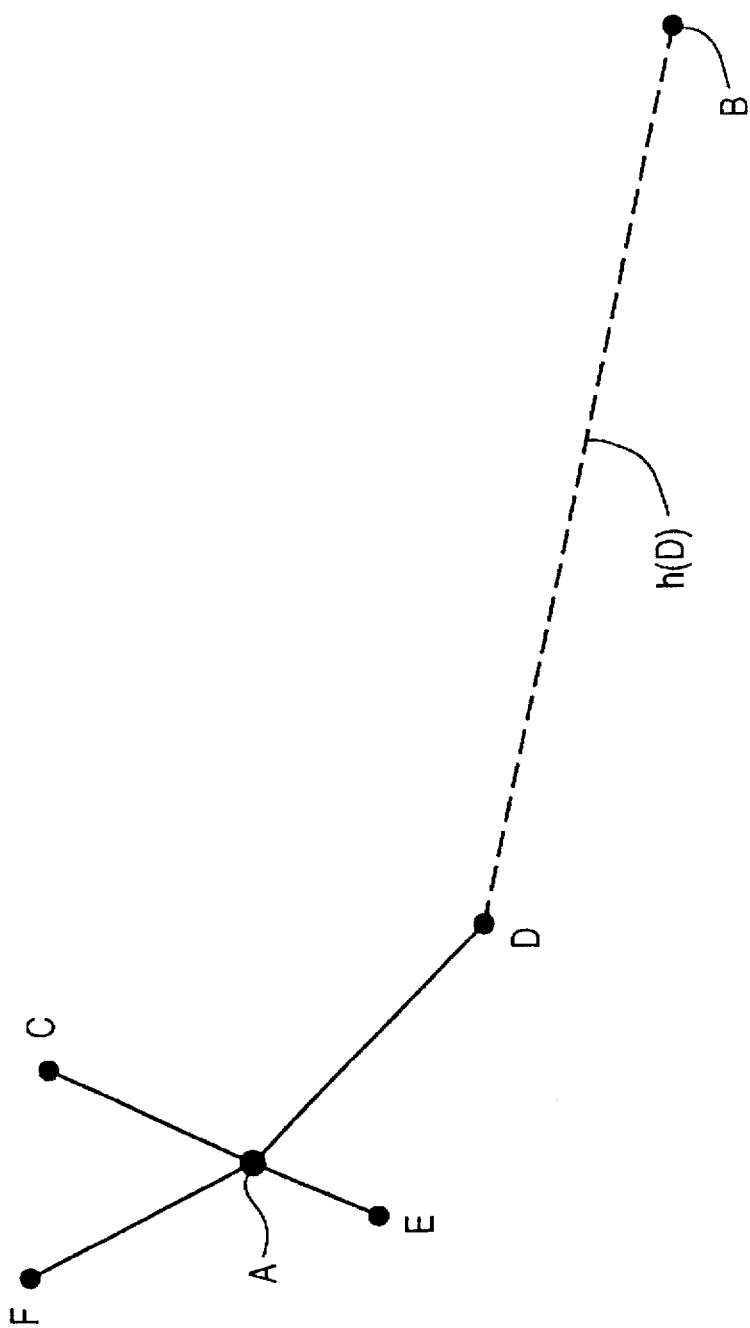
FIG. 2 illustrates the route calculation methodology employed by a vehicle navigation system designed according to a specific embodiment of the invention.

The determination of a route from a source location A to a final destination B using the vehicle navigation system of FIG. 1 will be understood with reference to FIG. 2. In a specific embodiment of the invention, vehicle navigation system 10 employs a two-ended route calculation algorithm. That is, system 10 explores paths emanating from point A and paths leading backwards from point B. Initially, the search patterns emanate from both points A and B in all directions. FIG. 2 illustrates how one of four road segments emanating from point A is chosen for continued route exploration. Each road segment, n, has an associated segment cost, g(n), and each node, k, has associated node and heuristic costs, g(k) and h(k), respectively. The segment cost for each segment is added to the node and heuristic costs for its endpoint to obtain an overall cost value for each. The road segment having the lowest overall cost is then selected for further calculation. In FIG. 2, the road segment terminating at point D is selected primarily because the heuristic cost associated with point D, i.e., the distance between points D and B, is less than the heuristic costs associated with points C, E, and F. This process is then repeated for point D, and each newly calculated route point thereafter. It should be noted that the heuristic cost for each new possible route point is calculated based on the distance between the possible route point and the last determined route point at the other end of the search. This has the effect of redirecting and narrowing the search area over the course of the route calculation so that the search concentrates more on the area between points A and B. When the system arrives at a point for which the heuristic cost is zero, the route calculation is complete. It should also be noted that, according to one embodiment of the invention, once the search algorithm on either end identifies a road segment to be included in the route which is of a higher category than the previous road segment, road segments of the lower category are ignored for the rest of the route determination process. This reflects the fact that the most logical routes generally increase road categories at the beginning and decrease road categories at the end. For example, a typical route might start on a residential street, move onto a major road, and then onto a freeway. The user would most likely remain on the freeway until she is near the final destination, at which point she would exit the freeway onto a major road, and then end up on a residential street.

It becomes apparent that for particularly densely digitized map databases, the above-described procedure becomes a highly complicated and time consuming determination which results in delays in the communication of route instructions and upcoming maneuvers to the user. As discussed earlier, the present invention avoids these delays by selecting an intermediate destination close to the initial source location, calculating a route to the intermediate location, and communicating the intermediate route while continuing to determine the route to the final destination. But how does the system know when to use this feature? In one embodiment, the feature may be selected based on parameters such as the known relationship between the initial source location and the final destination and their geographical surroundings, e.g., both locations are in densely digitized urban areas separated by a sparsely digitized rural or highway area. In another embodiment, intermediate destinations are always determined, but a best intermediate destination is not chosen and the intermediate route is not communicated to the user unless the determination of the entire route takes longer than a programmable timeout period. This embodiment will be discussed in greater detail below. The method by which the present invention selects an intermediate destination is described with reference to FIG. 3.

Figure 3:
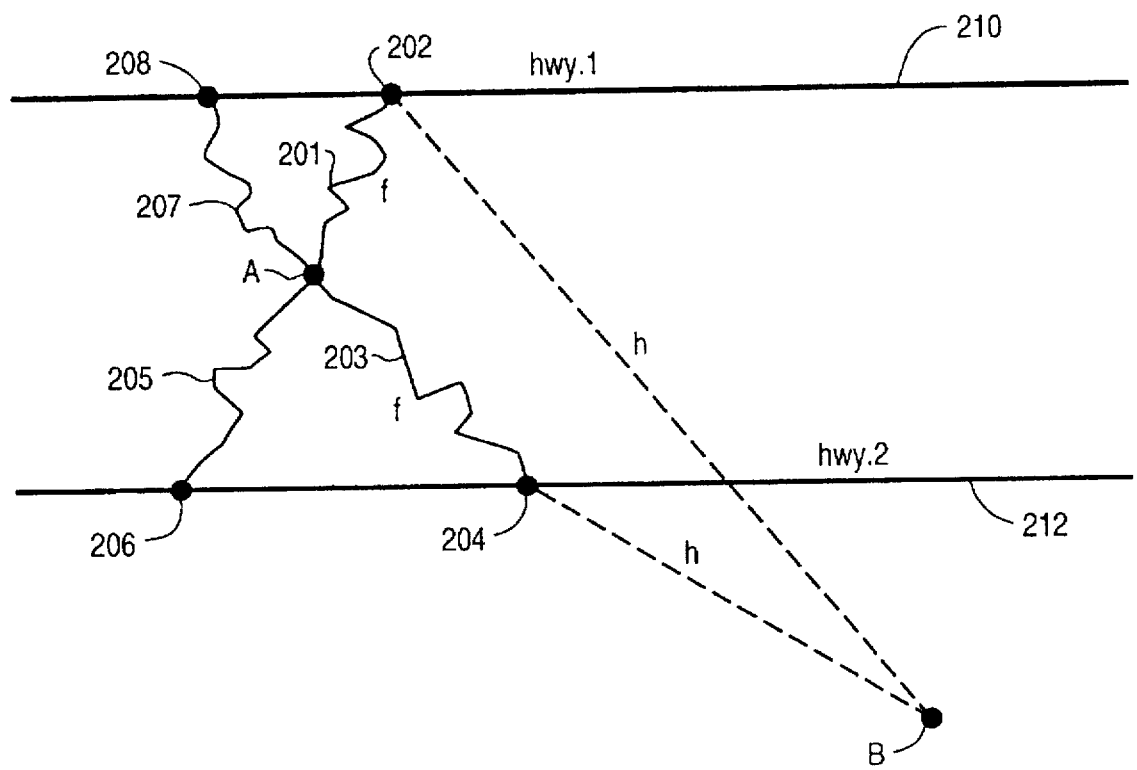
FIG. 3 illustrates the intermediate destination selection methodology according to a specific embodiment of the invention.

FIG. 3 shows a source location at point A and a final destination at point B. Point A generally represents the stationary starting position of the vehicle. However, if route calculation is performed while the vehicle is moving, point A may be chosen at a position ahead of the current vehicle position. Parameters such as the vehicle's direction and speed may be taken into account for the determination of the source location in such a situation. Four possible intermediate routes 201, 203, 205, and 207 are shown from point A to four different intermediate destinations 202, 204, 206, and 208, respectively. The intermediate destinations in this example are access points to highways 210 and 212. Highway access points are often chosen as intermediate destinations because they are easily identifiable, and the forward route calculation from the highway access point becomes simplified for the reasons discussed above. Essentially, the intersection with any road which is of a higher category than the road of the source location may be selected as a possible intermediate destination.

Referring again to FIG. 3, the navigation system explores several possible paths in the map database emanating from point A during a timeout interval, after the expiration of which, the best candidate for the intermediate destination is chosen. The timeout interval may be a multilevel interval. That is, the interval may be programmed to expire after 10 seconds if 3 or more candidates are found, and after 20 seconds if only one or two are found. The figure shows a situation in which four candidates for an intermediate destination have been found, i.e., highway access points 202, 204, 206, and 208. Once the candidates are selected, the system calculates an overall cost f(dest) for each possible intermediate destination by combining all of the segment and node costs, i.e., g(n) and g(k), for the route leading to that destination with the heuristic cost associated with that destination, i.e., h(dest). In a specific embodiment, the relationship appears as follows:

$$f(dest) = \left[ \sum_{route} g(n) + g(k) \right] + h(dest) \quad (1)$$

It will be understood that there are a number of different ways in which these values could be combined, or in which cost values may be assigned to derive an overall cost value for each intermediate route. The present invention is not limited to the specific embodiment described.

Another method for selecting an intermediate destination is provided by the present invention. According to this embodiment, the user is presented with a list of highways and highway access points within 10 miles of the source location. The user may then select the desired highway and/or specific access point. This feature may be useful where, for example, the user knows that she needs to access a certain highway but requires route calculation to get to that highway from her current location.

Once the intermediate destination has been selected and the intermediate route generated, the appropriate series of maneuvers are communicated to the user via the system display. These generally comprise a series of screens, each of which communicates information regarding the next maneuver to be performed by the user like, for example, the distance to the next maneuver, or the nature of the next maneuver (e.g., left turn). While the system is providing the user with this information, the remainder of the route to the final destination and the corresponding maneuvers are determined using the intermediate destination as the starting point. In this way, navigation is allowed to begin before the entire route is determined, thereby allowing the user to begin driving almost immediately.

As briefly mentioned above, according to a specific embodiment of the invention, the vehicle navigation system may be programmed to wait until the expiration of a timeout period before selecting an intermediate destination. If the entire route to the final destination is determined within the timeout period, then the communication of an intermediate route is considered unnecessary and the intermediate destination is not selected. If, however, the entire route to the final destination is not complete before the expiration of the timeout interval, the system selects an intermediate destination and operates as described above. If the entire route is still not complete before the expiration of another timeout interval, the system may be programmed to determine another intermediate destination beyond the first intermediate destination. The selection of the next intermediate destination proceeds similarly to the selection of the first as described above. This process may be repeated until the remainder of the entire route has been determined. Alternatively, the system may be programmed to begin determining the next intermediate destination immediately if it is determined that the calculation of the route to the final destination is not yet complete. As with the first intermediate destination, the system may be programmed so that each successive intermediate route is fully determined and the corresponding maneuvers communicated to the user only when the determination of the remainder of the entire route is not yet complete or requires more than a programmable timeout interval.

Figure 4:
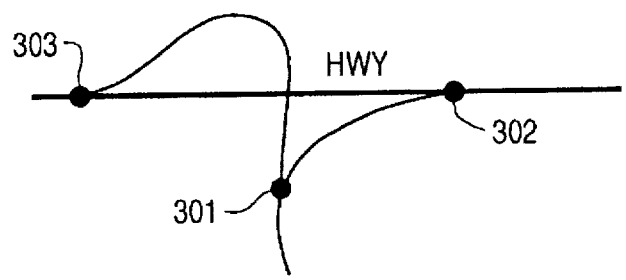
FIG. 4 illustrates the selection of an intermediate destination which allows further travel in either highway direction.

What if the intermediate location is so close that the vehicle arrives at the intermediate destination before the entire route determination is complete? If the intermediate location is a highway access point, the maneuver onto the highway can be communicated to the user with a follow up instruction such as, for example, "Stay on the highway— Calculating the rest of the route". How then does the system know which direction of travel on the highway to communicate? Different embodiments of the present invention deal with this situation in the following ways. According to one embodiment, the direction of travel is deduced based on the direction from the highway access point to the final destination. According to another embodiment, a first intermediate destination 301 is chosen before either of the access points 302 or 303 as shown in FIG. 4 so that either highway direction may be selected. In the mean time, another intermediate destination beyond the first intermediate destination, the route to which will be known by the time the first intermediate destination is reached.

Another solution to the problem of arriving at the first intermediate destination relates to the determination of further intermediate destinations. In this embodiment of the invention, if the entire route is still not complete by the time the vehicle arrives at the intermediate destination, the system may be programmed to determine another intermediate destination beyond the first intermediate destination. The selection of the next intermediate destination proceeds similarly to the selection of the first as described above. This process may be repeated until the remainder of the entire route has been determined. In a more specific embodiment, each intermediate route is fully determined and the corresponding maneuvers communicated to the user only when the determination of the remainder of the entire route requires more than a programmable timeout interval.

Figure 5:
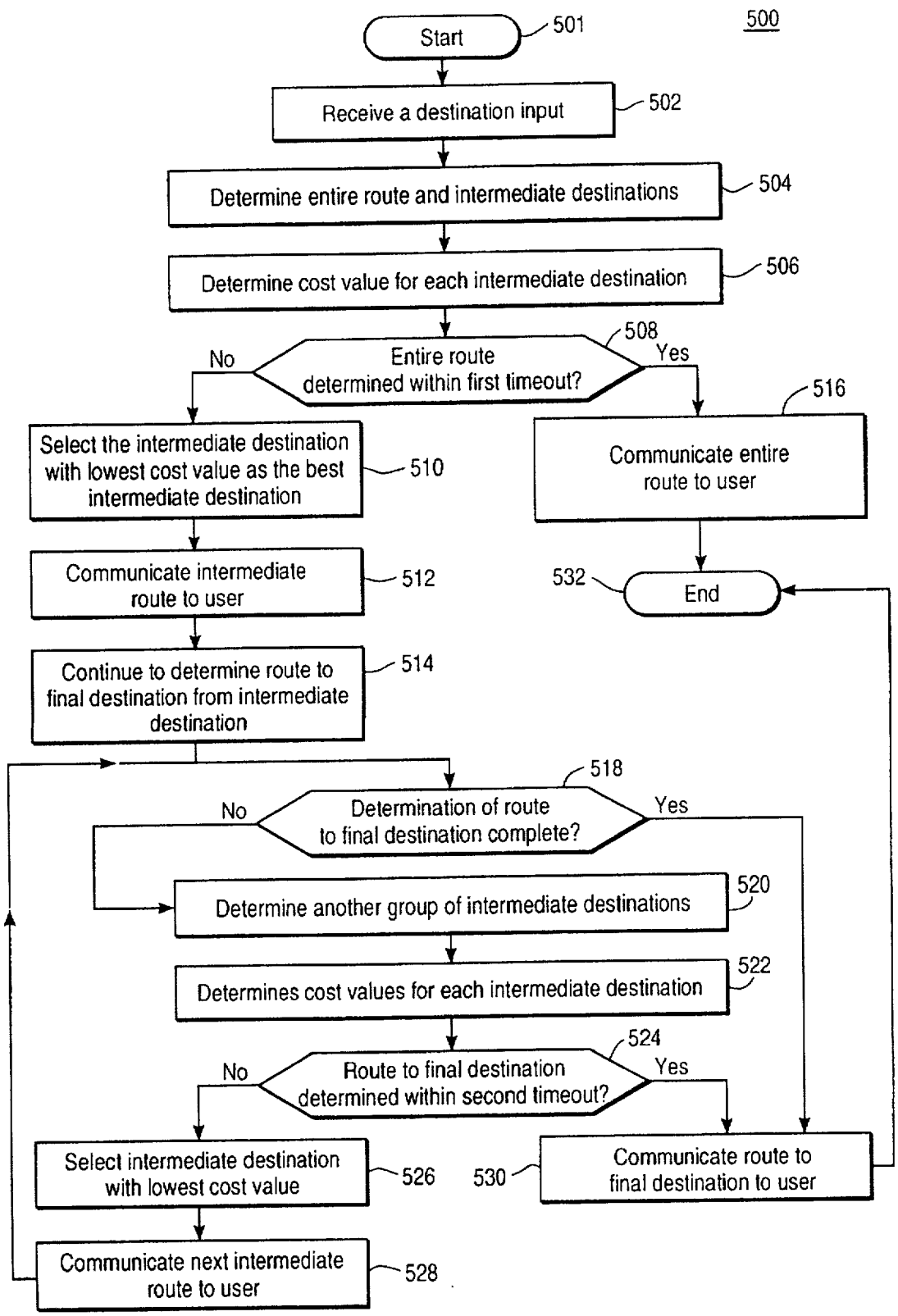
FIG. 5 is a flowchart describing the operation of a specific embodiment of the invention.

FIG. 5 is a flowchart 500 which describes the operation of a specific embodiment of the invention. Initially, the system receives a destination input by a user for the purpose of calculating a route to the destination (step 502). The system then begins to determine the route from the vehicle's current position to the desired destination while simultaneously determining at least one intermediate destination (step 504). The system then determines a cost value for each intermediate destination (step 506). If a programmable time interval passes and the determination of the entire route from the initial position to the final destination is not complete (step 508), the system selects the intermediate destination having the lowest cost value as the best intermediate destination (step 510) and communicates the intermediate route to the user (step 512). The system then continues to determine a route to the final destination from the intermediate destination (step 514). If, on the other hand, the determination of the entire route is complete, the entire route is communicated to the user (step 516).

If the determination of the route to the final destination is not yet complete (step 518), the system determines another group of intermediate destinations between the first intermediate destination and the final destination (step 520) and determines a cost values for each (step 522). If the route calculation is not complete after a second programmable time interval (step 524), the system again selects the intermediate destination with the lowest cost value (step 526) and communicates the next intermediate route to the user (step 528). Steps 518–528 may be repeated until the remainder route to the final destination has been determined, at which point it is communicated to the user (step 530).

Figure 6:
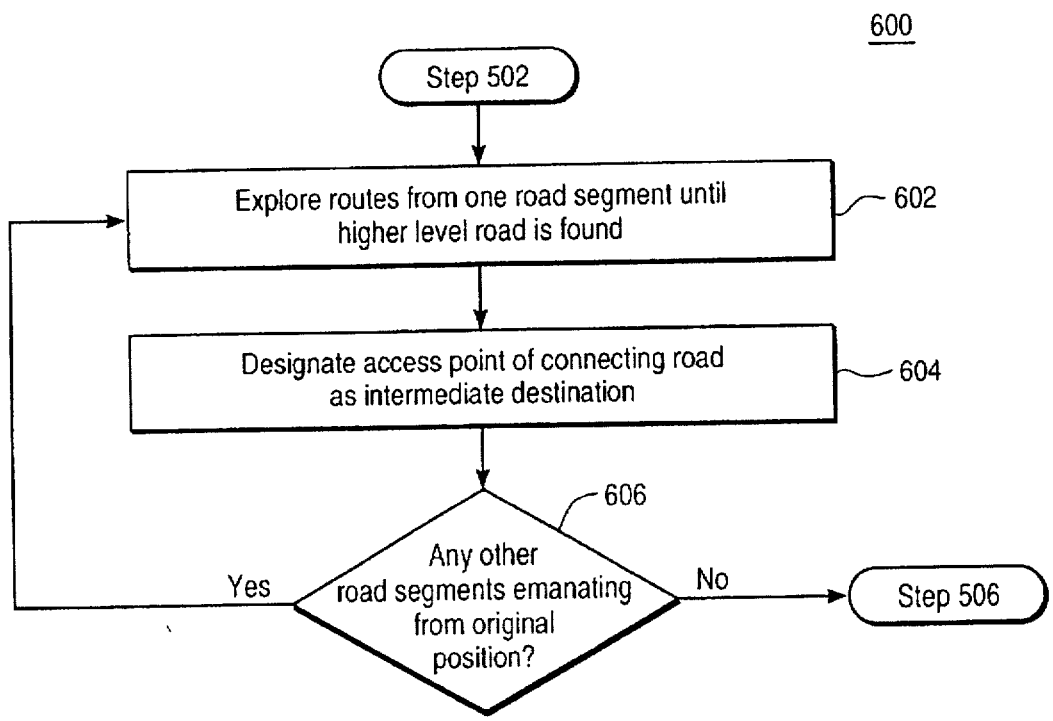
FIG. 6 is a flowchart describing the selection of a plurality of intermediate routes according to a specific embodiment of the invention.

FIG. 6 is a flowchart 600 describing the selection of a plurality of intermediate routes according to a specific embodiment of the invention. The system explores possible routes emanating from one of the road segments directly connected to the vehicle's original position until a connecting road is encountered having a hierarchy level greater than the hierarchy level of the original position's road (step 602). The system then designates the access point to the connecting road as one of the intermediate destinations (step 604). Steps 602 and 604 are then repeated for each of the road segments emanating from the original position (step 606).

Figure 7:
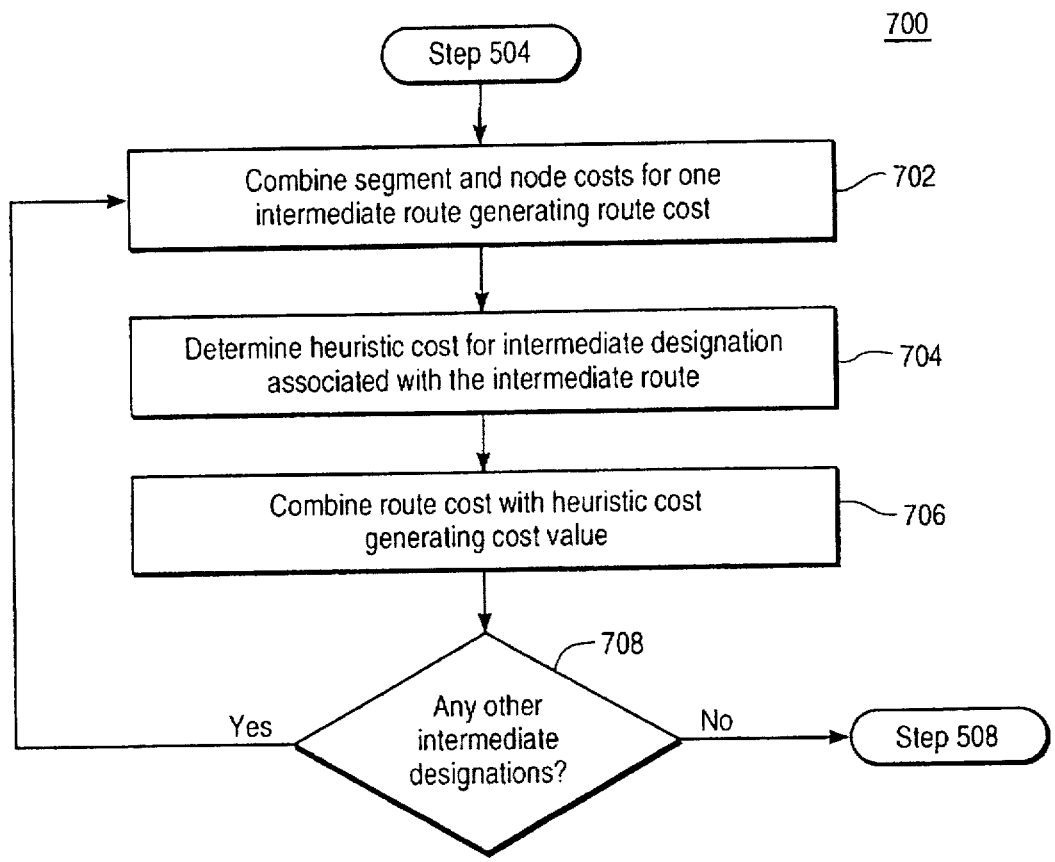
FIG. 7 is a flowchart describing the determination of cost values for a plurality of intermediate destinations according to a specific embodiment of the invention.

FIG. 7 is a flowchart 700 describing the determination of cost values for a plurality of intermediate destinations according to a specific embodiment of the invention. The system combines the segment and node costs for the road segments and nodes in one of the intermediate routes emanating from the vehicle's initial position, thereby generating a route cost for that intermediate route (step 702). The system then determines a heuristic cost for the intermediate destination associated with the intermediate route (step 704). The heuristic cost corresponds to the distance between the intermediate destination and the final destination. The system then combines the route cost with the heuristic cost and generates a cost value for the intermediate destination (step 706). Steps 702–706 are then repeated for each of the intermediate destinations (step 708).

While the invention has been particularly shown and described with reference to a specific embodiment thereof, it will be understood by those skilled in the art that the foregoing and other changes in the form and details may be made therein without departing from the spirit or scope of the invention.

What is claimed is:

1. A method for determining a route from a source location to a final destination using a vehicle navigation system having a map database, wherein the map database comprises a plurality of roads stored therein, each road having a hierarchy level associated therewith, the source location corresponding to a source road having a first hierarchy level, the method comprising the steps of:

determining at least one intermediate destination candidate from the map database, each intermediate destination candidate being at one end of an intermediate route from the source location, wherein the step of determining at least one intermediate destination candidate comprises the steps of:

exploring possible routes from a first road segment connected to the source location until a connecting road is encountered having a second hierarchy level, the connecting road having an access point associated therewith and the second hierarchy level being greater than the first hierarchy level;

designating the access point to the connecting road as the at least one intermediate destination candidate; and repeating the exploring and designating steps for each road segment connected to the source location;

calculating a cost value for each intermediate destination candidate;

selecting an intermediate destination, the cost value corresponding to the intermediate destination being lower than the cost values corresponding to any other intermediate destination candidates;

communicating the intermediate route corresponding to the intermediate destination to a user of the vehicle navigation system; and determining a remainder route to the final destination.

2. The method of claim 1 wherein the steps of selecting an intermediate destination and communicating the intermediate route occur only when the step of determining a remainder route requires more than a timeout period.

3. The method of claim 1 further comprising the steps of:

(A) determining at least one next intermediate destination candidate from the map database, each next intermediate destination candidate being at one end of a next intermediate route from a previously determined intermediate destination;

(B) calculating a cost value for each next intermediate destination candidate;

(C) selecting a next intermediate destination, the cost value corresponding to the next intermediate destination being lower than the cost values corresponding to any other next intermediate destination candidates;

(D) communicating the next intermediate route corresponding to the next intermediate destination to a user of the vehicle navigation system;

(E) repeating steps (A)–(D) until the remainder route has been determined.

4. The method of claim 3 wherein the steps of selecting a next intermediate destination and communicating the next intermediate route occur only when the step of determining a remainder route requires more than a timeout period.

5. The method of claim 1 wherein the step of communicating the intermediate route comprises displaying a series of vehicle maneuvers to the user, each maneuver corresponding to a portion of the intermediate route corresponding to the intermediate destination.

6. A method for determining a route from a source location to a final destination using a vehicle navigation system having a map database, the method comprising the steps of:

determining at least one intermediate destination candidate from the map database, each intermediate destination candidate being at one end of an intermediate route from the source location, each intermediate route comprising at least one node and at least one road segment in the map database connecting the source location and the intermediate destination candidate corresponding to the intermediate route, each node having a node cost associated therewith, and each road segment having a segment cost associated therewith;

calculating a cost value for each intermediate destination candidate by:
    (A) combining the segment and node costs for the road segments and nodes in a first intermediate route, thereby generating a route cost;
    (B) determining a heuristic cost for a first intermediate destination candidate associated with the first intermediate route, the heuristic cost corresponding to a first distance between the first intermediate destination candidate and the final destination;
    (C) combining the route cost for the first intermediate route with the heuristic cost for the first intermediate destination candidate, thereby generating a first cost value for the first intermediate destination candidate; and
    (D) repeating steps (A)–(C) for any remaining intermediate destination candidates;

selecting an intermediate destination, the cost value corresponding to the intermediate destination being lower than the cost values corresponding to any other intermediate destination candidates;

communicating the intermediate route corresponding to the intermediate destination to a user of the vehicle navigation system; and determining a remainder route to the final destination.

7. The method of claim 6 wherein the segment cost associated with each road segment corresponds to an estimate of a time interval required for traversing the road segment.

8. The method of claim 6 wherein the node cost associated with each node corresponds to an estimate of a time interval required for traversing the node.

9. The method of claim 6 wherein the first distance corresponds to a substantially straight-line distance between the first intermediate destination candidate and the final destination.

10. The method of claim 6 wherein the steps of selecting an intermediate destination and communicating the intermediate route occur only when the step of determining a remainder route requires more than a timeout period.

11. The method of claim 6 further comprising the steps of:
  (A) determining at least one next intermediate destination candidate from the map database, each next intermediate destination candidate being at one end of a next intermediate route from a previously determined intermediate destination;
  (B) calculating a cost value for each next intermediate destination candidate;
  (C) selecting a next intermediate destination, the cost value corresponding to the next intermediate destination being lower than the cost values corresponding to any other next intermediate destination candidates;
  (D) communicating the next intermediate route corresponding to the next intermediate destination to a user of the vehicle navigation system;
  (E) repeating steps (A)–(D) until the remainder route has been determined.

12. The method of claim 11 wherein the steps of selecting a next intermediate destination and communicating the next intermediate route occur only when the step of determining a remainder route requires more than a timeout period.

13. The method of claim 6 wherein the step of communicating the intermediate route comprises displaying a series of vehicle maneuvers to the user, each maneuver corresponding to a portion of the intermediate route corresponding to the intermediate destination.

14. A method for determining a route from a source location to a final destination using a vehicle navigation system having a map database, the map database comprising a plurality of roads stored therein, each road having a hierarchy level associated therewith, the source location corresponding to a source road having a first hierarchy level, the method comprising the steps of:

selecting an intermediate destination from the map database, the intermediate destination being at one end of a corresponding intermediate route from the source location, the step of selecting an intermediate destination comprising the steps of:

exploring possible routes from a road segment connected to the source location until a connecting road is encountered having a second hierarchy level, the connecting road having an access point associated therewith and the second hierarchy level being greater than the first hierarchy level; and designating the access point to the connecting road as the intermediate destination;

communicating the intermediate route corresponding to the intermediate destination to a user of the vehicle navigation system; and determining a remainder route to the final destination.

* * * * *